United States Patent
Ignatin

(12) 
(10) Patent No.: US 7,894,800 B2
(45) Date of Patent: *Feb. 22, 2011

(54) METHOD FOR RE-ESTABLISHING TELEPHONE CALLS AFTER UNINTENDED TERMINATION

(75) Inventor: Gary Ignatin, Newport Coast, CA (US)

(73) Assignee: Broadcom Corp.

( * ) Notice: Subject to any disclaimer, the term of this patent is extended or adjusted under 35 U.S.C. 154(b) by 27 days.

This patent is subject to a terminal disclaimer.

(21) Appl. No.: 12/364,690

(22) Filed: Feb. 3, 2009

(65) Prior Publication Data

US 2009/0143050 A1    Jun. 4, 2009

Related U.S. Application Data

(63) Continuation of application No. 10/928,019, filed on Aug. 27, 2004, now Pat. No. 7,486,949.

(60) Provisional application No. 60/551,949, filed on Mar. 10, 2004.

(51) Int. Cl.
*H04M 3/42* (2006.01)

(52) U.S. Cl. ............... 455/414.1; 455/450; 455/423; 455/509; 455/422.1; 455/504; 370/335; 370/331; 379/201.01

(58) Field of Classification Search ............. 455/414.1, 455/422.1, 423, 450, 504, 509; 370/335, 370/331; 379/201.01
See application file for complete search history.

(56) References Cited

U.S. PATENT DOCUMENTS

| | | | |
|---|---|---|---|
| 6,445,918 B1* | 9/2002 | Hellander | 455/423 |
| 6,556,816 B1* | 4/2003 | Gafrick et al. | 455/404.1 |
| 6,667,962 B1* | 12/2003 | Lee et al. | 370/335 |
| 7,486,949 B2* | 2/2009 | Ignatin | 455/414.1 |
| 7,728,145 B2* | 6/2010 | Antonini | 546/229 |
| 2002/0049073 A1* | 4/2002 | Bell | 455/552 |
| 2004/0142694 A1* | 7/2004 | Levy et al. | 455/450 |
| 2004/0235509 A1* | 11/2004 | Burritt et al. | 455/519 |
| 2005/0043048 A1* | 2/2005 | Dolan et al. | 455/509 |
| 2007/0274488 A1* | 11/2007 | Callaghan | 379/201.01 |

* cited by examiner

*Primary Examiner*—Pierre-Louis Desir
(74) *Attorney, Agent, or Firm*—McAndrews, Held & Malloy, Ltd.

(57) ABSTRACT

A system for operating a wireless mobile device that automatically re-establishes a telephone call after unintended disconnection is disclosed and may include at least one processor operable to wirelessly receive, via a communication network, a first telephone call having associated information identifying a calling party. The at least one processor may be operable to determine whether the calling party or the wireless mobile device is to establish a second telephone call between the calling party and the wireless mobile device upon failure of the first telephone call. The at least one processor may be operable to store the information identifying the calling party of the first telephone call, and to detect a failure of the first telephone call. The at least one processor may be operable to determine whether call re-establishment should be attempted, based upon one or more pre-determined factors.

174 Claims, 9 Drawing Sheets

METHOD FOR RE-ESTABLISHING TELEPHONE CALLS AFTER UNINTENDED TERMINATION

RELATED APPLICATIONS

This application is a continuation of U.S. patent application Ser. No. 10/928,019 filed Aug. 27, 2004 (now U.S. Pat. No. 7,486,949), which makes reference to, claims priority to, and claims the benefit of U.S. Provisional Patent Application Ser. No. 60/551,949, entitled "Method For Re-Establishing Telephone Calls After Unintended Termination", filed Mar. 10, 2004, the complete subject matter of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Users of present day cellular telephone networks frequently experience the loss or "dropping" of a call. Dropped calls in cellular networks may result from a variety of causes including, for example, gaps in cellular coverage, system congestion during periods of heavy usage, and the failure of call handoffs. When a wireless call ends, the wireless subscriber is frequently not informed whether the other party ended the call, or whether the call was dropped due to a problem with the wireless network connection, even though the wireless network or the cellular telephone may have that information. A user may continue to carry on a conversation after the other party is no longer part of the call. Each time a call is dropped, one of the parties must redial the other party's number to re-establish the call. Some cellular telephones provide an audible tone to indicate to the user when an idle cellular phone enters and exits areas of cellular service. The cellular telephone user, however, does not necessarily know when and where cellular coverage will be re-established, or for how long. Although there are typically multiple wireless service providers for a given geographic area, a subscriber is usually restricted to the use of their own service provider, even when coverage by their own service provider is poor. Therefore, the user must repeatedly check the cellular telephone (which typically has a display indicating signal strength) to determine when there is sufficient coverage to re-establish the call, or must repeatedly and blindly activate the "redial" feature of the cellular telephone, if one is provided, until the call is re-established. Even if the redial feature is available, the telephone of the party that received the call would not be able to take advantage of that feature since it did not originate the call. The process of re-establishing the dropped call is particularly unsafe when the user is driving an automobile, and in any instance is extremely inconvenient. Moreover, when signal strength is just barely sufficient to establish calls, it is not uncommon for there to be a rapid succession of drops and redials.

In some situations, one or both parties may not know the number of the other party. This may occur when a call is dropped after the connection to the called party has been completed by directory assistance, or when the call was placed to a central number and a then connection to the extension of the called party is established. In addition, a subscriber may be on hold or in a queue when the call is lost, and may lose their priority and be forced to re-establish the call through a series of menu choices.

Often, one party to the call still has cellular coverage, or is served via a wired network connection. The party with working cellular or telephone service may call the party whose service failed and, being unable to establish contact due to lack of coverage, is directed to the dropped user's voicemail. While the party with service is leaving a message, the wireless subscriber who lost coverage may regain it, and may then attempt to re-establish the call. They may then receive a busy signal, and to add to the confusion, received notification of a voicemail message. This may continue to delay re-establishing the call.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Aspects of the present invention may be seen in a method of automatically re-establishing a telephone call after unintended disconnection. Such a method may comprise receiving a first telephone call via a wireless communication network, storing information identifying an origin of the first telephone call, detecting a failure of the first telephone call, and automatically establishing a second telephone call to the origin of the first telephone call using the stored information. The wireless communication network may comprise a cellular communication network. The detecting may use at least one characteristic of a wireless communication link. In various representative embodiments of the present invention, the at least one characteristic may comprise a signal strength, an error rate, a signal to noise ratio, and an Eb/No measurement. A representative embodiment of the present invention may comprise waiting a predetermined amount of time. Another representative embodiment may comprise determining whether at least one characteristic of a wireless communication link meets a predetermined condition, initiating the second telephone call if the predetermined condition is met, and refraining from initiating the second telephone call if the predetermined condition is not met. In various representative embodiments of the present invention, the at least one characteristic may comprise a signal strength, an error rate, a signal to noise ratio, and an Eb/No measurement. In various representative embodiments of the present invention, the stored information may comprise a dialable telephone number, a directory number (DN), a temporary location directory number (TLDN), a mobile identification number (MIN), an international mobile station identifier (IMSI), a temporary mobile station identifier (TMSI), and an electronic serial number (ESN). Yet another representative embodiment of the present invention may comprise notifying a user that a telephone call is about to be re-established. In various representative embodiments of the present invention, the notifying may comprise an audible alert, a vibratory alert, and a visual alert.

Additional aspects of the present invention may be found in a method of automatically re-establishing a telephone call after unintended disconnection. A representative embodiment of the present invention may comprise originating a first telephone call via a wireless communication network, storing information identifying a destination of the first telephone call, detecting a failure of the first telephone call, and automatically establishing a second telephone call to the destination of the first telephone call using the stored information. The wireless communication network in a representative embodiment of the present invention may comprise a cellular communication network, and the detecting may use at least one characteristic of a wireless communication link. In various representative embodiments of the present invention, the at least one characteristic may comprise a signal strength, an error rate, a signal to noise ratio, and an Eb/No measurement. A representative embodiment in accordance with the present invention may comprise waiting a predetermined amount of time. In addition, the establishing in a representative embodiment of the present invention may comprise determining whether at least one characteristic of a wireless communication link meets a predetermined condition, initiating the second telephone call if the predetermined condition is met, and refraining from initiating the second telephone call if the predetermined condition is not met. In various representative embodiments of the present invention, the at least one characteristic may comprise a signal strength, an error rate, a signal to noise ratio, and an Eb/No measurement. In various embodiments in accordance with the present invention, the stored information may comprise a dialable telephone number, a directory number (DN), a temporary location directory number (TLDN), a mobile identification number (MIN), an international mobile station identifier (IMSI), a temporary mobile station identifier (TMSI), and an electronic serial number (ESN). A representative embodiment in accordance with the present invention may also comprise notifying a user that a telephone call is about to be re-established. In various representative embodiments of the present invention, the notifying may comprise an audible alert, a vibratory alert, and a visual alert.

Further aspects of the present invention may be observed in a method of automatically re-establishing a telephone call after unintended disconnection. A representative embodiment in accordance with the present invention may comprise establishing a first telephone call between a first party and a second party, where at least one of the first party and the second party communicate via a wireless communication network. Such an embodiment may also comprise storing information identifying the first party and the second party, detecting a failure of the first telephone call, and automatically establishing a second telephone call between the first party and the second party using the stored information. The wireless communication network in a representative embodiment of the present invention may comprise a cellular communication network. The detecting may use at least one characteristic of a wireless communication link. In various representative embodiments of the present invention, the at least one characteristic may comprise a signal strength, an error rate, a signal to noise ratio, and an Eb/No measurement. Some embodiments of the present invention may comprise waiting a predetermined amount of time. In addition, the establishing in a representative embodiment of the present invention may comprise determining whether at least one characteristic of a wireless communication link meets a predetermined condition, initiating the second telephone call if the predetermined condition is met, and refraining from initiating the second telephone call if the predetermined condition is not met. In various representative embodiments of the present invention, the at least one characteristic may comprise a signal strength, an error rate, a signal to noise ratio, and an Eb/No measurement. The stored information in various embodiments in accordance with the present invention may comprise a dialable telephone number, a directory number (DN), a temporary location directory number (TLDN), a mobile identification number (MIN), an international mobile station identifier (IMSI), a temporary mobile station identifier (TMSI), and an electronic serial number (ESN). A representative embodiment of the present invention may comprise notifying a user that a telephone call is about to be re-established. In various representative embodiments of the present invention, the notifying may comprise an audible alert, a vibratory alert, and a visual alert.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1A:
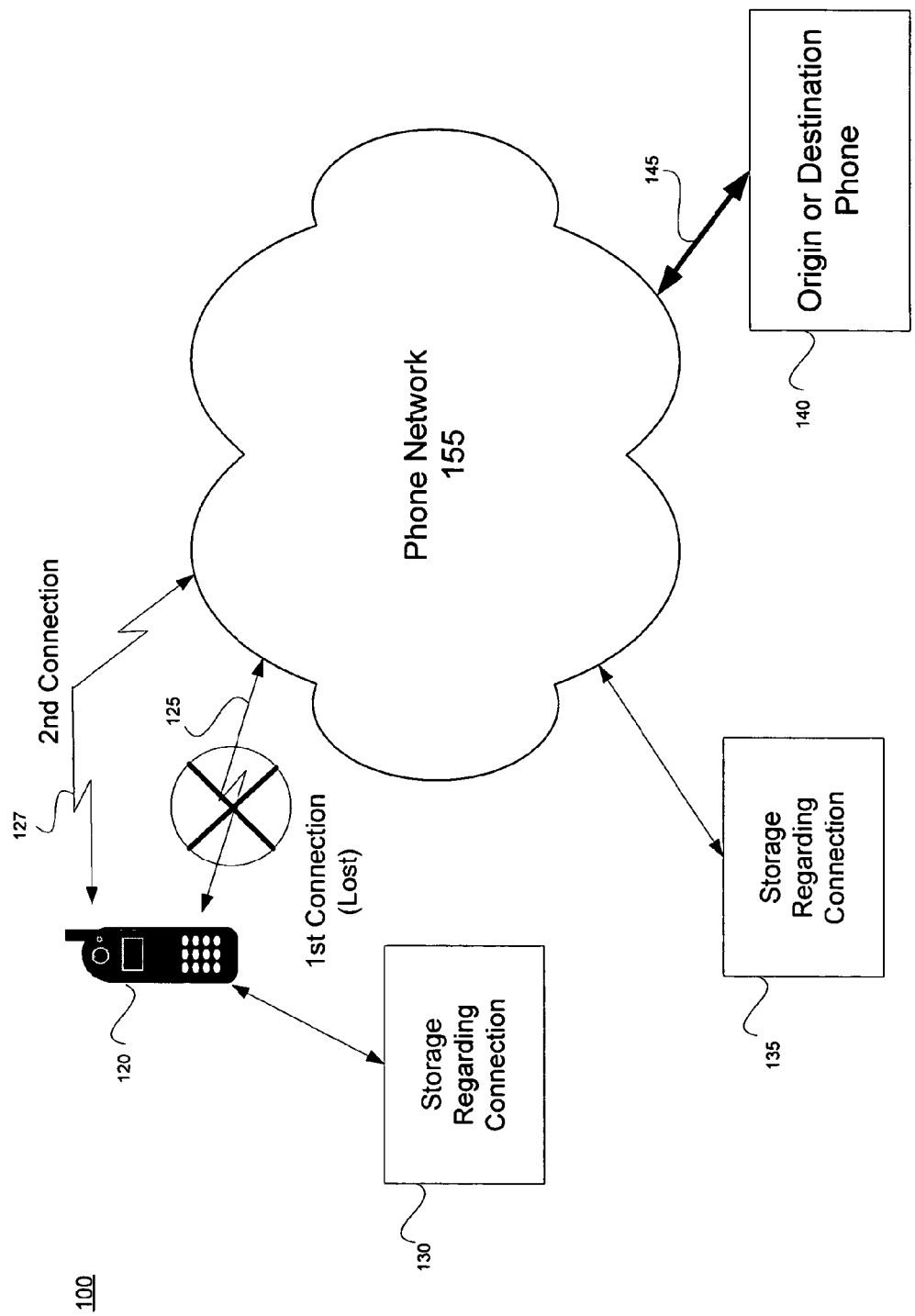
FIG. 1A illustrates an exemplary wireless communication network in accordance with a representative embodiment of the present invention.

FIG. 1A illustrates an exemplary wireless communication network 100 in accordance with a representative embodiment of the present invention. The wireless communication network 100 of FIG. 1A comprises a phone network 155 communicatively coupled via facility 145 to a phone 140 capable of originating and/or receiving calls. The wireless communication network 100 also comprises a wireless handset 120 capable of establishing communication via the phone network 155. As shown in the illustration, the wireless handset 120 may establish communication with the phone 140 via a first connection 125. During the establishment of the $1^{st}$ connection 125, the wireless handset 120 in a representative embodiment of the present invention may store in storage 130, information related to the arrangement of the call. In another representative embodiment of the present invention, the phone network 155 may store information related to the arrangement of the call in storage 135. At some point after establishment of the call, the 1$^{st}$ connection 125 supporting communication between wireless handset 120 and phone 140 may be lost. In a representative embodiment of the present invention, the wireless handset 120 may automatically re-establish the communication with the phone 140 via a 2$^{nd}$ connection 127 and phone network 155 using the call-related information in storage 130. In another representative embodiment in accordance with the present invention, the phone network 155 may automatically re-establish communication between the wireless handset 120 and the phone 140 using call-related information from storage 135. Although the phone 140 may appear to have a wired connection to phone network 155, an embodiment of the present invention is not limited in this regard. The phone 140 may be connected to the phone network 155 using, for example, a wireless, cellular, wired, packet, optical, or other communication link.

Figure 1B:
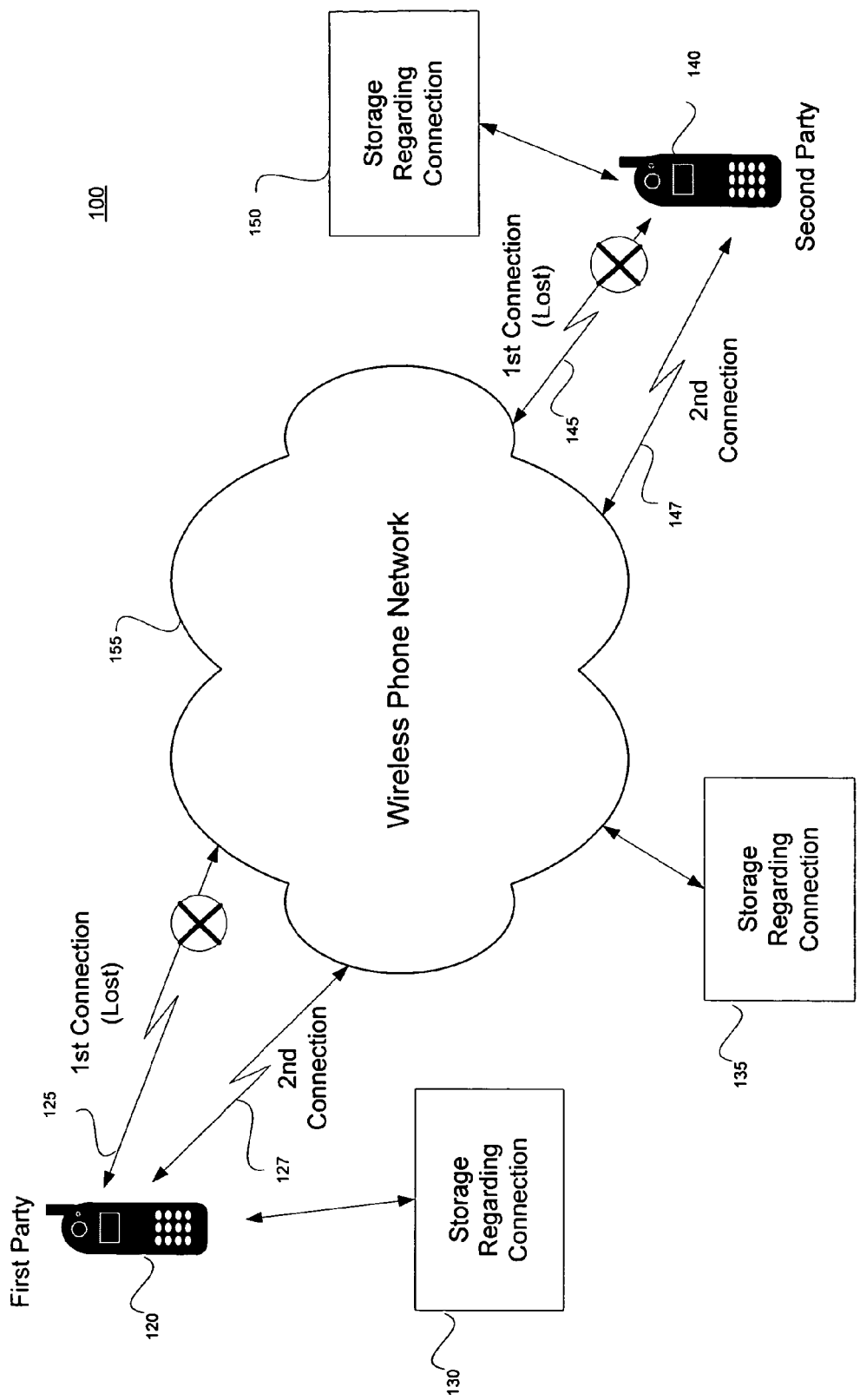
FIG. 1B illustrates an exemplary wireless communication network in accordance with another representative embodiment of the present invention.

FIG. 1B illustrates an exemplary wireless communication network 100 in accordance with another representative embodiment of the present invention. The wireless communication network 100 of FIG. 1B comprises a wireless phone network 155 capable of establishing communication between a wireless handset 120 of a first party and a wireless handset 140 of a second party. As shown in the illustration, the wireless handsets 120,140 may establish mutual communication via first connections 125,145. During the establishment of the 1$^{st}$ connection 125, the wireless handset 120 in a representative embodiment of the present invention may store information related to the arrangement of the call in storage 130, and the wireless handset 140 may store information related to the arrangement of the call in storage 150. In another representative embodiment of the present invention, the wireless phone network 155 may store information related to the arrangement of the call in storage 135. At some point after establishment of the call, either or both of 1$^{st}$ connections 125,145 supporting communication between the wireless handsets 120,140 may be lost. In a representative embodiment of the present invention, either of the wireless handsets 120,140 may automatically re-establish communication with the other via the 2$^{nd}$ connections 127,147 using the call-related information in the storage components 130,150. In another representative embodiment in accordance with the present invention, the wireless phone network 155 may automatically re-establish communication between the wireless handsets 120,140 using call-related information from storage 135. In yet another representative embodiment of the present invention, the wireless handsets 120,140 may automatically and cooperatively re-establish communication.

Figure 1C:
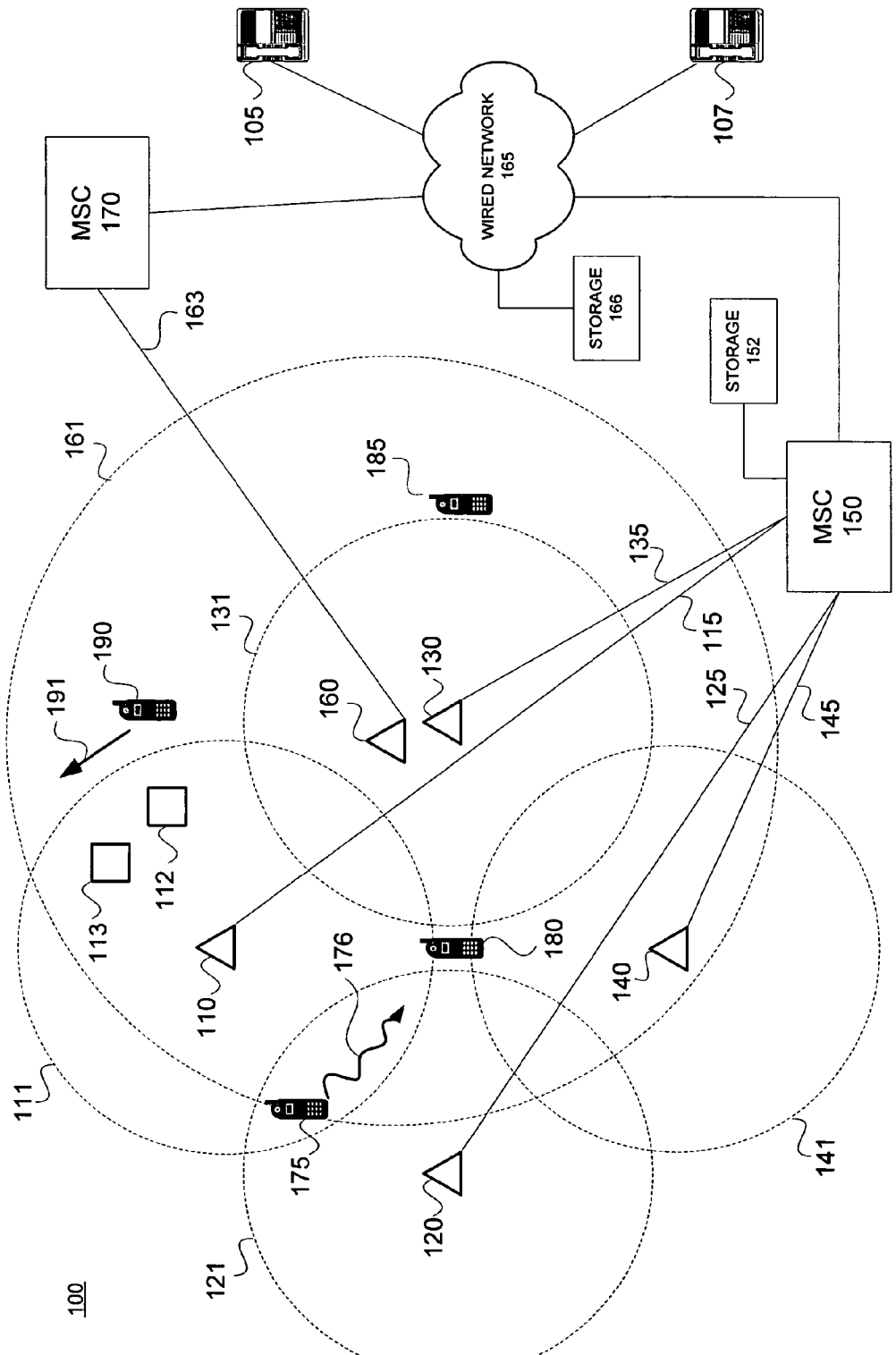
FIG. 1C illustrates an exemplary communication network, that may correspond to the communication networks of FIG. 1A or 1B, in accordance with a representative embodiment of the present invention.

FIG. 1C provides a detailed illustration of an exemplary communication network 100, that may correspond to the communication network 100 of FIG. 1A or FIG. 1B, in accordance with a representative embodiment of the present invention. The wireless communication network 100 of FIG. 1C comprises wireless base stations 110, 120, 130, 140 in communication with a mobile switching center (MSC) 150 of a first wireless service provider via communication links 115, 125, 135, 145, respectively, and a wireless base station 160 in communication with a MSC 170 of a second wireless service provider via communication link 163. The wireless communication network 100 also comprises mobile handsets 175, 180, 185, and 190. The wireless network 100 may comply with one or more air interface standards such as, for example, EA/TIA-553 analog, IS-95/IS-2000 code division multiple access (CDMA), IS-136 time division multiple access (TDMA), and global system for mobile communications (GSM) standards, to name only a few. Each of the wireless base stations 110, 120, 130, 140 and 160, and mobile handsets 175, 180, 185, 190 may be equipped with receivers and transmitters capable of functioning using one or more of the current or future air interface standards, and may communicate information over wireless network 100 using, for example, a circuit switched or packet switched connection mechanism. For purposes of explanation, the areas of coverage of each of the base stations 110, 120, 130, 140, 160 are represented in FIG. 1C by the coverage regions 111, 121, 131, 141, 161, respectively. The coverage regions 111, 121, 131, 141 and 161 overlap. In the overlapping areas, service may be provided by more than one of the base stations 110, 120, 130, 140, 160. Although the wireless base stations 110, 120, 130, 140, 160 are shown as connected to two MSCs 150, 170, the wireless network 100 may comprise a greater or lesser number of MSCs and base stations without departing from the scope or spirit of the present invention. Subsets of wireless base stations such as the wireless base stations 110, 120, 130, 140, 160 within a wireless network such as the wireless network 100 may each be associated with one of a number of MSCs such as MSCs 150, 170, where each MSC may be operated by a different provider of wireless service.

The illustration of FIG. 1C also shows station set equipment 105 and 107, that may also engage in communication with the mobile handsets 175, 180, 185, 190 via the wired network 165. In a representative embodiment of the present invention, wired network 165 may be, for example, a circuit switched or packet switched (e.g., a voice over Internet protocol (VoIP)) network. Although the illustration of FIG. 1C shows a particular complement of base stations, mobile handsets, mobile switching centers, and wired network infrastructure, the illustration of FIG. 1C is for purposes of explanation, and does not represent limitations of the present invention.

In various representative embodiments of the present invention the wireless network 100 may be, for example, an EIA/TIA-553 analog network, an IS-95/IS-2000 or similar code division multiple access (CDMA) network, an IS-136-based time division multiple access (TDMA) network, a global system for mobile communication (GSM) network, a combination of the above, or any similar wireless voice and/or data network. In a representative embodiment of the representative embodiment of the present invention, a mobile handset such as the mobile handsets 175, 180, 185, 190 of FIG. 1C may originate and/or accept calls to/from another of the mobile handsets 175, 180, 185, 190 served by the wireless network 100, or station set equipment such as the station sets 105 and 107 connected to wired network 165. In a representative embodiment of the present invention, information related to the establishment of the call may be stored, for example, in the mobile handset 175, 180, 185, 190 (storage not shown for reasons of clarity), at a serving MSC 150, 170, by the wired network 165, or, for example, in storage 152 associated with MSC 150 or in storage 166 associated with wired network 165, in a fashion similar to that discussed above with respect to the wireless communication networks 100 of FIGS. 1A and 1B.

Various sources of radio frequency (RF) impairment, disruptions, and/or congestion of the wireless or wired network may cause a call in a wireless network such as the wireless network 100 to be dropped. For example, the mobile handset 190 of FIG. 1C may experience a loss of signal from the serving base station 110 due to "shadowing" of the mobile handset 190 as it passes behind one or more buildings 112, 113. This is illustrated in FIG. 1C when the mobile handset 190 travels along the route indicated by path 191. The user of the mobile handset 190 may find that a series of obstacles such as, for example, the buildings 112, 113 of FIG. 1C cause large changes in signal strength or quality. A mobile handset may also be operating along the boundary of two or more base stations, such as the arrangement of the mobile handset 175 and the base stations 110, 120. In such a situation, the signals of the mobile handset 175 may be repeatedly acquired and lost by the base stations 110, 120 of FIG. 1C as the handset moves along a path such as path 176. In yet another situation, mobile handsets such as, for example, the mobile handsets 180, 185 may be operating in a marginal RF environment for a service provider, such as the "dead spot" amidst the base stations 110, 120, 130, 140, that is experienced by the mobile handset 180, or the service area fringe of the base station 130 seen by the mobile handset 185. Both of these examples of impaired RF coverage occur in areas served by base stations connected to the MSC 150. Some of the coverage regions 111, 121, 131, 141 of base stations 110, 120, 130, 140 are also contained within the coverage area 161 of the base station 160 served by MSC 170. Depending upon arrangements between the service providers of the MSCs 150, 170, a subscriber of one service provider may receive service through either the MSC 150 of the first wireless service provider or the MSC 170 of the second wireless service provider, or both.

The mobile handset of a wireless subscriber may experience a series of large decreases and increases in the strength of signal available, or in the quality of the signal, depending upon the motion of the wireless subscriber, the positions of the serving base station(s), the location of any obstructions, and the number of wireless subscribers currently using the wireless network 100. The wireless subscriber call may be "dropped" or "lost" each time that a mobile handset or the serving base station(s) determine that the wireless communication link is of insufficient quality or strength. The terms "lost", "loss", and "dropping" are used in this application to refer to the disconnection of a call that is not a result of a request by a party to the call. The loss/dropping of a call may result, for example, from impairments in the wireless link between the mobile handset and the serving base station(s), as described above, or from problems within the infrastructure of a wireless network such as wireless network 100, or within a wired network such as, for example, wired network 160, that is a part of the call path. A wireless subscriber in such a situation may make repeated attempts to re-establish the call, only to have the call drop again. In a representative embodiment of the present invention, a dropped or lost call may be automatically re-established, without the need for the wireless subscriber to be actively involved. This may be accomplished using the call-related information stored by the mobile handset 175, 180, 185, 190, the serving MSC 150, 170, or by the wired network 165.

Figure 2A:
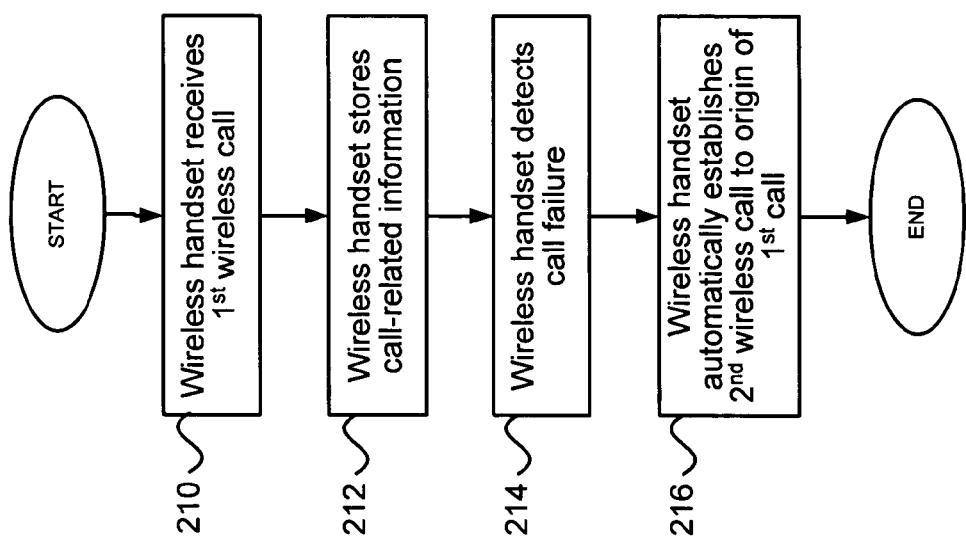
FIG. 2A is a flowchart of an exemplary method of managing a wireless telephone call, in accordance with a representative embodiment of the present invention.

FIG. 2A is a flowchart of an exemplary method of managing a wireless telephone call, in accordance with a representative embodiment of the present invention. The method illustrated in FIG. 2A begins when a wireless call is received by a wireless handset such as, for example, one of the mobile handsets 175, 180, 185, 190 of FIG. 1C (210). The wireless handset may then stored call-related information (212). At some point in the call, the wireless handset detects that the connection with the far-end party has failed, and the call has been lost (214). The wireless handset may then use the stored call-related information to automatically re-establish communication with the far-end party via a second wireless connection (216).

Figure 2B:
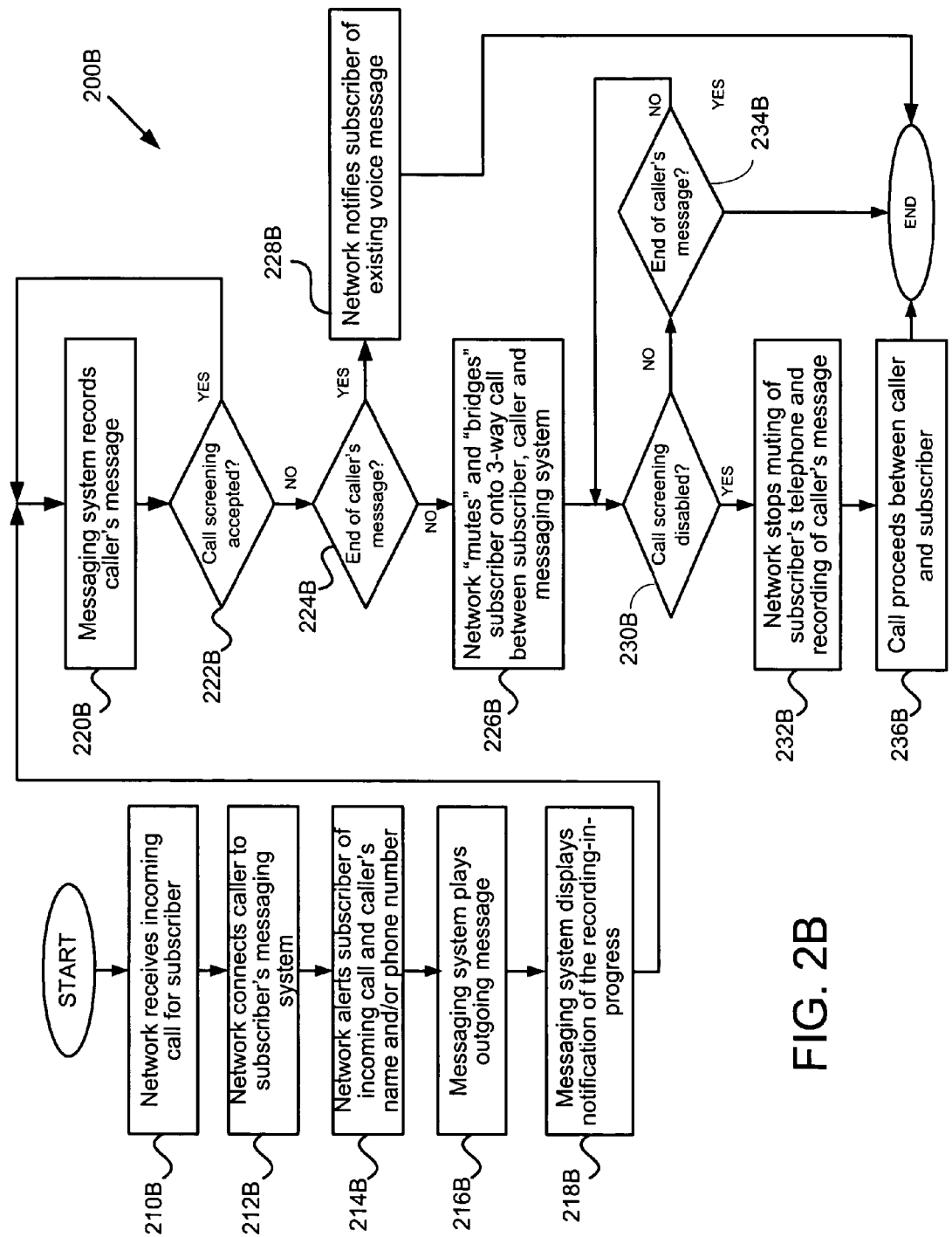
FIG. 2B is a detailed flowchart showing the progress of an exemplary wireless telephone call, in accordance with a representative embodiment of the present invention.

FIG. 2B is a detailed flowchart showing the progress of an exemplary wireless telephone call, in accordance with a representative embodiment of the present invention. The wireless telephone call begins when a wireless call is first established (block 210). At that time, details about the call such as, for example, information identifying the network locations of the called and calling parties are stored. The call then proceeds (block 212). During the wireless telephone call, the call is monitored to check whether the call is experiencing impairments (block 214). If the call is proceeding satisfactorily, a check is made as to whether the user has chosen to end the call (block 216). If no such request from the user has been received, the call continues (block 212), and the call status continues to be monitored. If the user has requested to end the call, the call ends (block 228).

If it is determined that the call is experiencing impairments that threaten the continued existence of the call, an attempt is made to maintain the call (block 218). This may involve, for example, handing the call off to another base station. A check is made as to whether call has been lost/dropped (block 220). If the call has been dropped, a check is made as to whether call recovery should be attempted (block 222). If for some reason call recovery should not be attempted, the call ends (block 228). If, however, call recovery should be attempted, the wireless user is notified that the call will be re-established (block 224), and the call is re-established using the stored call-related information (block 226). Once the call is re-established, the call proceeds normally (block 216).

In a representative embodiment of the present invention, the actions illustrated by FIG. 2B may be performed by a mobile handset such as, for example, one of the mobile handsets 175, 180, 185, 190 of FIG. 1C. In such an embodiment, the mobile handset may perform call recovery by automatically re-establishing a lost/dropped call when the mobile handset determines that the signals from one or more base stations such as, for example, the base stations 110, 120, 130, 140 and 160 of FIG. 1C, are of sufficient quality to re-establish and/or maintain a connection. In a representative embodiment of the present invention, the mobile handset may notify the wireless subscriber that the mobile handset is about to re-establish the lost/dropped call. The notification may be provided, for example, in the form of an audible alert, a vibratory alert, or a visual alert. Such notice may give the subscriber an opportunity to stop the placement of the new call, and may be important, for example, to halt re-establishment when, for example, the need for the call no longer exists, too much time has elapsed, or the cost of the new call is not acceptable (e.g., for call re-establishment while roaming).

A representative embodiment of the present invention may inhibit re-establishment of the call, based on one or more parameters set by the subscriber. For example, the subscriber may not want calls re-established, or may wish to re-establish a call only when the call will be placed using the service provider of the subscriber (a non-roaming call), when not more than a subscriber programmed amount of time has elapsed since the call was dropped, when not more that a predetermined number of attempts have been made to re-establish the lost connection, when a certain air interface technology will be used, etc.

A representative embodiment of the present invention may also determine whether to re-establish a lost call based upon the identity of the called or calling party. A subscriber may be permitted to identify the telephone numbers of the parties for which call recovery should be attempted. For example, a parent may identify the telephone numbers of the mobile handsets of their children as being those for which re-establishment should be attempted when a call is lost/dropped. A health care professional such as a doctor may designate that any number from a group of numbers having a particular prefix, such as that of a hospital, office, or treatment facility, should initiate an automatic attempt to re-establish a lost/dropped call. Using a combination of the parameters described above, a representative embodiment of the present invention may provide the ability to tailor the initiation of call recovery to the significance of the call.

A representative embodiment of the present invention may permit a subscriber using a "multi-mode" handset to program a different set of parameter values for each mode of the mobile handset. This may be used for the management of the automatic re-establishment of dropped/lost calls based upon the air interface standard in use for the lost call, or the available alternates for call re-establishment. The situations in which a mobile handset experiences lost/dropped calls may depend upon the technology used in the wireless network. For example, a mobile handset in a wireless network in which "hard" handoffs (i.e., those in which the RF carrier frequency changes) occur may experience a greater number of dropped calls in particular situations than if "soft" handoffs (i.e., those in which a simultaneous connection with two or more base stations is arranged) are supported). For this reason, a representative embodiment of the present invention may permit a wireless subscriber to set parameter(s) stipulating the type of air interface to be used to re-establish calls. This may also include the use of alternate service providers, where more than one service provider is available, such as the arrangement in the illustration of FIG. 1C.

A representative embodiment of the present invention may re-establish both mobile originated and mobile terminated calls that are lost/dropped. At the time a call is placed, the wireless subscriber normally provides information identifying the destination or called party. This is generally in the form of a dialable telephone number, but in various representative embodiments of the present invention information used to identify the called party may also be in the form of a temporary location directory number (TLDN), a mobile identification number (MIN), an international mobile station identifier (IMSI), a temporary mobile station identifier (TMSI), an electronic serial number (ESN), or the like. The mobile handset transmits the identity of the destination or called party to the serving base station(s) such as, for example, the base stations 110, 120, 130, 140, 160 shown in FIG. 1C. The serving base station, then forwards the identifying information to an MSC such as, for example, the MSC 150 of FIG. 1C, for analysis and establishment of the path through the serving wireless or wired network to the destination or called party. A copy of the destination address or identifier sent by the mobile handset is typically stored in the mobile handset, and is frequently used to provide a called party number display, and features such as "redial". In a representative embodiment of the present invention, the mobile handset may use the stored information identifying the destination of the call to re-establish a lost call to another subscriber of the wireless network, or to a subscriber accessible via an interconnected wired network such as, for example, the wired network 160 of FIG. 1C.

A representative embodiment of the present invention may also aid the wireless subscriber by re-establishing incoming or "mobile terminated" calls that are lost. During the establishment of a mobile terminated call, the mobile handset typically receives information identifying the party originating the call. This information may be referred to as the "calling party identification" or "caller ID", and is typically the dialable telephone number of the calling party. In various representative embodiments of the present invention it may also comprise a temporary location directory number (TLDN), a mobile identification number (MIN), an international mobile station identifier (IMSI), a temporary mobile station identifier (TMSI), an electronic serial number (ESN), or the like. In general, a mobile handset stores the information identifying the calling party for later use in, for example, a call log. In a representative embodiment of the present invention, the stored information identifying the calling party may be used by the mobile handset to automatically place a mobile originated call back to the calling party, following the loss of the call.

In a representative embodiment of the present invention, the mobile handset may initiate a new call when one or more characteristics of the wireless network service meet predetermined measures. For example, the quality or strength of the wireless network signals may be measured in terms of signal strength, an error rate, a signal to noise ratio, or an Eb/No measurement. Other information that may be used to determine whether network conditions are suitable for re-establishment of the call includes, for example, the nature or urgency of the call (e.g., according to the call destination), the geographic location of the mobile handset relative to wireless network elements or past history of call behavior, and similar factors.

In yet another representative embodiment of the present invention, one or more of the mobile handsets on a call may, if so enabled, send an indication to the mobile handset(s) of the other party/parties, or to a wireless network entity, that the sending mobile handset is capable of and/or enabled to re-establish lost/dropped calls. This permits those mobile handset(s) with adequate wireless service to provide a local notification that another party to the call will re-establish the call when able. If more than one of the mobile handsets on a call is capable and enabled to act in re-establishing the call, the capable and enabled mobile handsets may negotiate the task of call re-establishment. This aspect of the present invention allows a user to avoid needlessly redialing when he/she is be unable to re-connect, and helps to avoid the frequent "crossing messages" that occur when parties are attempting to dial each other. The indication of the capability to re-establish calls, and the negotiation of the mobile handset to be responsible for call re-establishment may be exchanged using, for example, a messaging mechanism like the short message service provided by many existing air interface protocols, or by dedicated wireless network messages designed for that purpose.

Figure 3A:
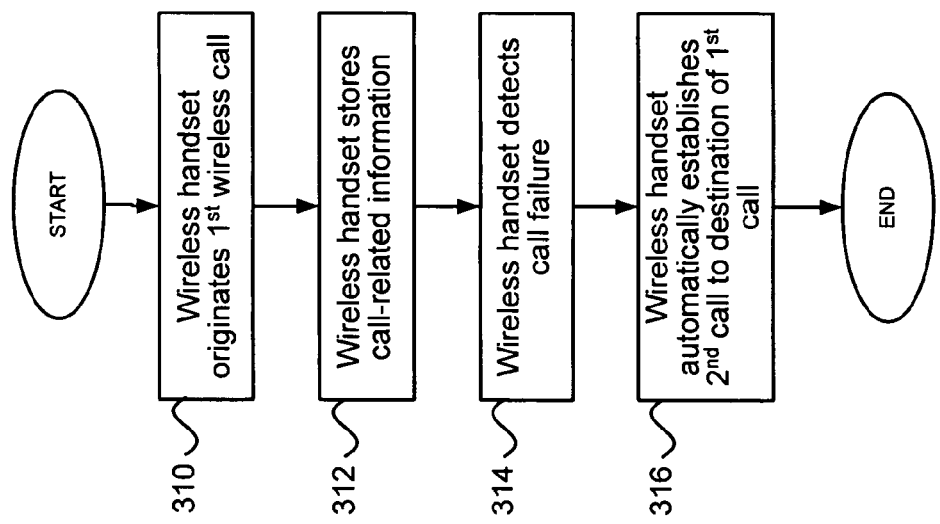
FIG. 3A is a flowchart illustrating an exemplary method of operating a mobile handset, in accordance with a representative embodiment of the present invention.

FIG. 3A is a flowchart of an exemplary method of managing a wireless telephone call, in accordance with a representative embodiment of the present invention. The method illustrated in FIG. 3A begins when a wireless call is originated by a wireless handset such as, for example, one of the mobile handsets 175, 180, 185, 190 of FIG. 1C (310). The wireless handset may then stored call-related information (312). At some point in the call, the wireless handset detects that the connection with the far-end party has failed, and the call has been lost (314). The wireless handset may then use the stored call-related information to automatically re-establish communication with the far-end party via a second wireless connection (316).

Figure 3B:
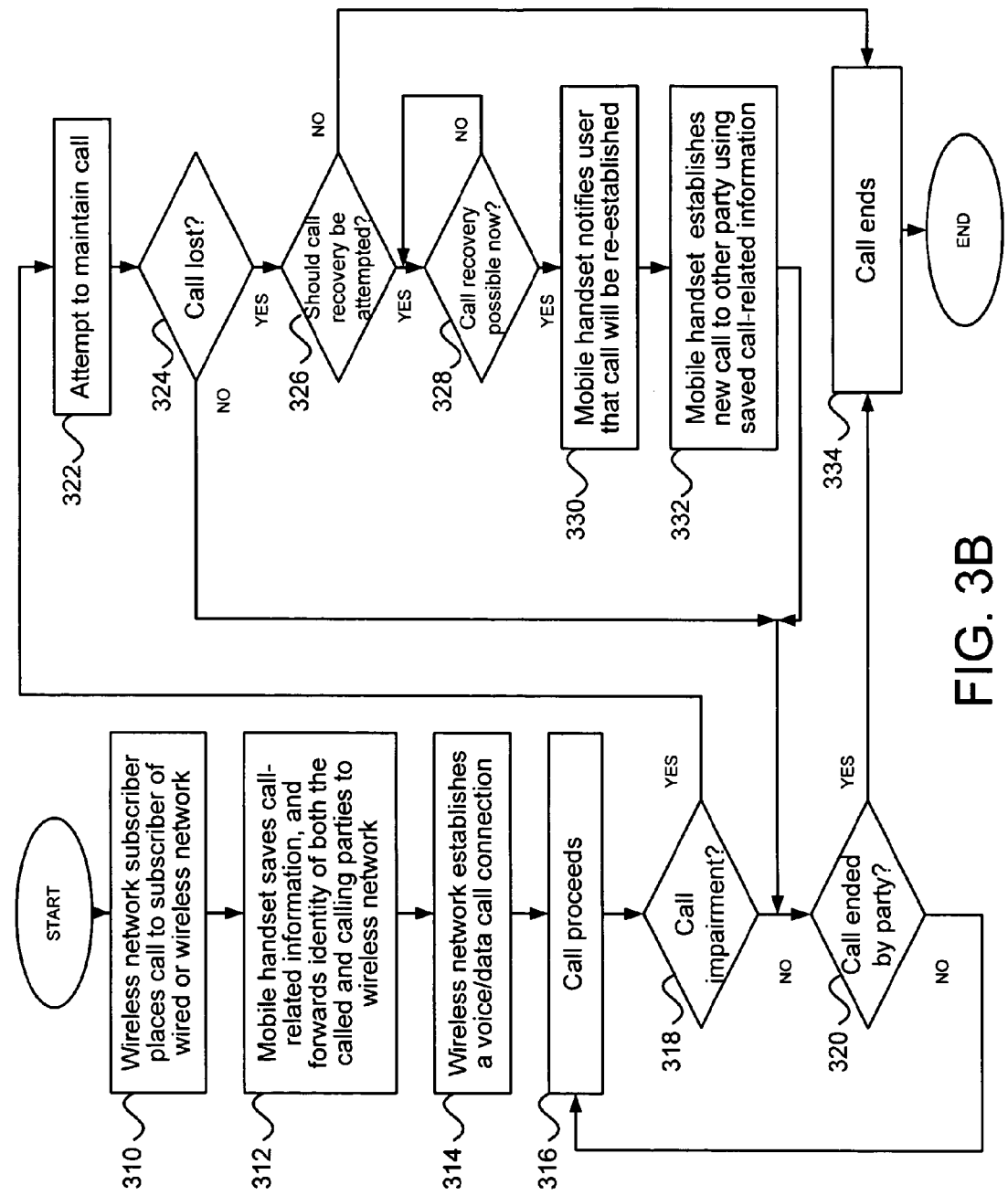
FIG. 3B is a detailed flowchart illustrating an exemplary method of operating a mobile handset, in accordance with a representative embodiment of the present invention.

FIG. 3B is a detailed flowchart illustrating an exemplary method of operating a mobile handset, in accordance with a representative embodiment of the present invention. The following example of automatic call recovery by a wireless mobile handset is offered as a means of explanation and clarification, and is not necessarily representative of any limitations of the present invention. With reference to the elements of the illustration of FIG. 1C, the method begins when a wireless network subscriber such as, for example, a subscriber using one of mobile handsets 175, 180, 185, 190 places a call to another subscriber of wireless network 100, or to a subscriber of the wired network 165 (block 310). Although this example is in terms of a mobile originated call, a similar approach may be used for mobile terminated calls.

Following entry of the destination telephone, the wireless subscriber places the call (i.e., presses the "SEND" key), and the mobile handset saves the identity of the called party and forwards information about the identity of both the called and calling parties to an MSC such as, for example, the MSCs 150, 170 of the wireless network 100 (block 312). The MSC then establishes a voice/data call connection with the called party, either within the wireless network 100, or a wired network such as, for example, wired network 165 (block 314). The call then proceeds in the typical fashion (block 316).

During the wireless call, checks are made to detect the presence of impairments that may affect the viability of the call (block 318). If no call impacting impairments occurred, a check is made whether the user of the mobile handset or the wireless network has requested that the call be ended (block 320). If such a request has been made, the call ends (block 334). If no such request has been made, the call continues (block 316). If call impacting impairments have occurred, an attempt to maintain the call may be made (block 322). If the call is successfully maintained (block 324), the call proceeds (block 320).

If, however, the call is lost/dropped, a check is made whether call recovery should be attempted by the mobile handset (block 326). If, for some reason, the mobile handset is not enabled to attempt call recovery, the call ends (block 334). If the mobile handset is enabled to perform call recovery, the mobile handset checks whether call recovery is possible based, for example, upon wireless network conditions (block 328). If not, the mobile handset keeps checking whether call recovery is possible (block 328). If call recovery is possible, the mobile handset notifies the user that an attempt will be made to re-establish the connection to the called party, using the information stored at the time that the call was originally placed (block 330). The mobile handset then re-establishes the call (block 332). A representative embodiment of the present invention may be used in cases where both the origin and the destination of the lost call are within a wireless network, and where the called party exists within a wired network, such as the wired network 160 of FIG. 1C.

In another representative embodiment of the present invention, the automatic re-establishment may be performed by a wireless network entity such as, for example, a mobile switching center such as the MSCs 150, 170 of FIG. 1C. When a mobile originated call is established, the mobile handset transmits information concerning both its own identity and the identity of the call destination to a base station such as, for example, one or more of base stations 110, 120, 130, 140, 160. Information containing the mobile identity and the identity of the destination may then be forwarded by the serving base stations 110, 120, 130, 140, 160 to the serving MSC 150, 170 for use in routing and billing the call. The serving MSC 150, 170 therefore, has knowledge of the identities of both the origin and the destination of the call. If the call should be lost/dropped, the MSC 150, 170 may examine a subscriber database located at the MSC 150, 170, or at a remote location (e.g., a home location register (HLR) or similar entity, not shown) to determine whether either of the origin and destination parties to the call have requested that a lost call be automatically re-established. The MSC 150, 170 may then attempt to re-establish the lost call. In a manner similar to the automatic call re-establishment described above with respect to a mobile handset, a representative embodiment of the present invention may permit a subscriber to establish a set of parameters to govern the conditions under which a lost call may be re-established by a wireless network entity such as, for example, the MSCs 150, 170 of FIG. 1C.

Figure 4A:
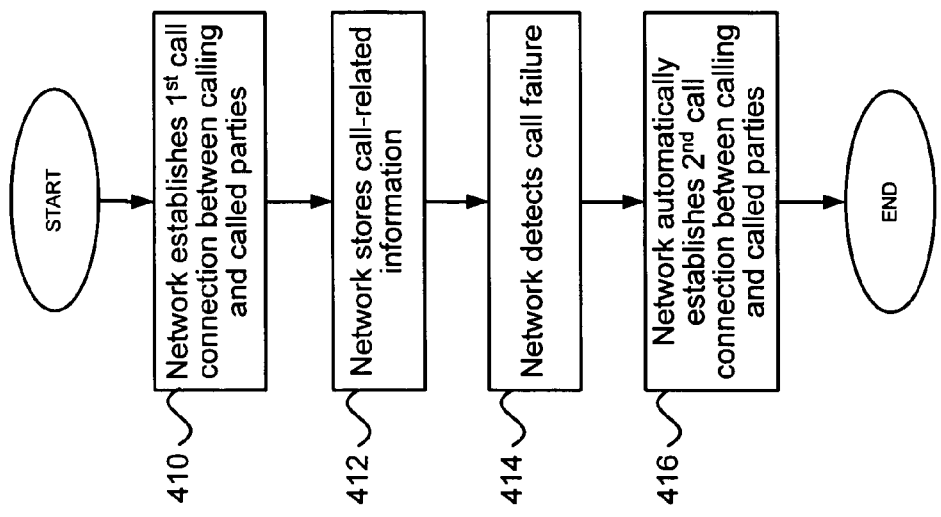
FIG. 4A is a flowchart illustrating an exemplary method of operating a wireless communication network, in accordance with a representative embodiment of the present invention.

FIG. 4A is a flowchart illustrating an exemplary method of operating a communication network such as the wireless communication network 100 of FIG. 1C, in accordance with a representative embodiment of the present invention. The method illustrated in FIG. 4A begins when a call is established between calling and called parties by a communication network such as, for example, the phone network 155 of FIG. 1A, or the wireless communication network 100 of FIG. 1C (410). The network may then store call-related information (412). At some point in the call, the network may detect that the call connection between the near and far-end parties has failed, and the call connection has been lost (414). The network may then use the stored call-related information to automatically re-establish communication between the near and far-end parties via a second call connection (416).

Figure 4B:
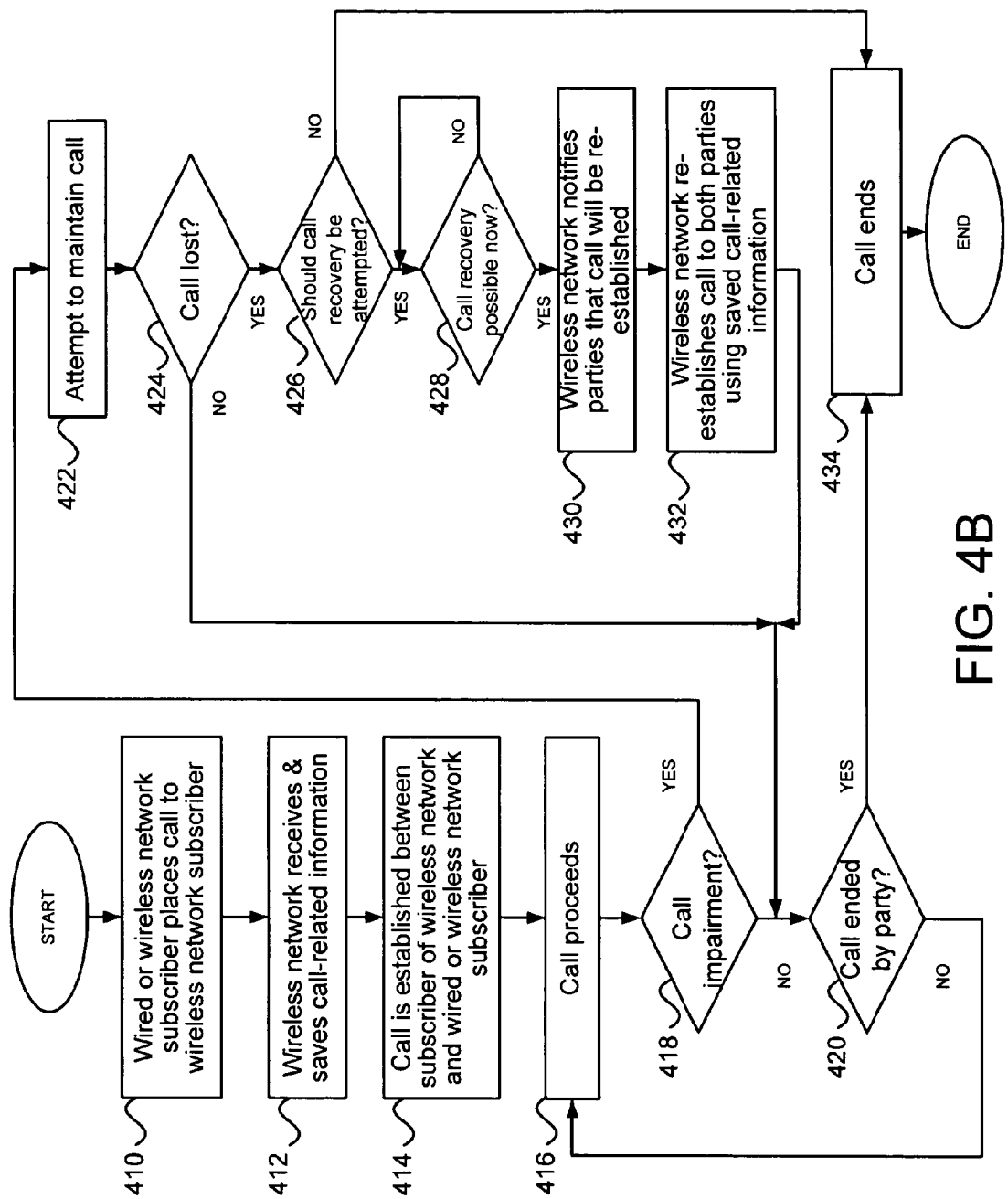
FIG. 4B is a detailed flowchart illustrating an exemplary method of operating a wireless communication network such as the wireless communication network of FIG. 1C, in accordance with a representative embodiment of the present invention.

FIG. 4B is a detailed flowchart illustrating an exemplary method of operating a wireless communication network such as the wireless communication network 100 of FIG. 1C, in accordance with a representative embodiment of the present invention. The following example of automatic call recovery by a wireless communication network is offered as a means of explanation and clarification, and is not necessarily representative of any limitations of the present invention. With reference to the elements of the illustration of FIG. 1C, the method begins when a wireless or wired network subscriber such as, for example, a subscriber using one of mobile handsets 175, 180, 185, 190, or a user of station set equipment 105 and 107 in wired network 165 places a call to a subscriber of wireless communication network 100 (block 410). Although this example is in terms of a mobile terminated call, a similar network-based call recovery approach may be used for mobile originated calls. Following dialing of the destination telephone number by the calling party, the wireless communication network 100 receives and saves call-related information identifying the calling and called parties (block 412). An MSC such as the MSCs 150, 170 then establishes a voice/data call between the calling subscriber of the wired or wireless communication network and the called wireless network subscriber (block 414). The call then proceeds in the typical fashion (block 416).

During the call, checks are made to detect the presence of impairments that may affect the viability of the call (block 418). If no call impacting impairments occurred, a check is made whether the a party to the call (i.e., the user of the called mobile handset or the calling wired or wireless communication network subscriber) has requested that the call be ended (block 420). If such a request has been made, the call ends (block 434). If no such request has been made, the call continues (block 416). If call impacting impairments have occurred, an attempt to maintain the call may be made (block 422). If the call is successfully maintained (block 424), the call proceeds (block 420).

If, however, the call is lost/dropped, a check is made whether call recovery should be attempted for the wireless subscriber (block 426). If call recovery is not enabled, the call ends (block 434). If call recovery is enabled, the wireless communication network checks whether call recovery is currently possible based, for example, upon wireless network conditions (block 428). If a connection to the called wireless subscriber cannot currently be re-established, the wireless communication network keeps checking whether call recovery is possible (block 428). If call recovery is possible, the wireless communication network notifies one or more of the parties to the call that an attempt will be made to re-establish the lost call connection, using the call-related information stored at the time that the call was originally established (block 430). The wireless communication network then re-establishes the call (block 432).

As described above, the terms "lost", "loss", and "dropped" are used herein to refer to the disconnection of a call that is not a result of a request by a party to the call. The loss of a wireless call may result, for example, from impairments in the wireless link between the mobile handset and the serving base station(s), from problems within the infrastructure of a wireless network such as, for example, wireless communication network 100, or from problems within a wired network that is a part of the call path such as, for example, wired network 165. A call within a wireless communication network may be lost due to causes related to the wireless communication network operation such as, for example, a deterioration of the RF environment as described above, a failure of the handoff of a call from one base station to another, and a wireless network equipment failure, to name only a few. The MSC serving the mobile handset receives information from the base stations(s) serving the mobile handset of the wireless subscriber, or through other communications within wireless network, that the call has been lost. In such a case, because no indication of a subscriber request for disconnection is received, the serving MSC may assume that the disconnection of the call is unintentional.

In yet other embodiments of the present invention, the re-establishment of the lost/dropped call may be performed by a combination of actions of the wireless communication network, and the mobile handset of the wireless subscriber. In one such embodiment of the present invention, the wireless communication network may request from the mobile handset information needed to re-establish the call. The wireless communication network may then re-establish the lost connection. In another representative embodiment of the present invention, the mobile handset may request from the wireless network information needed to re-establish the call. This may be particularly important when the actual network location of the called party is not the network location used at the time the call was originally placed such as, for example, when calls are forwarded, or a call is completed or transferred as sometimes happens with calls to directory assistance.

A representative embodiment in accordance with the present invention may attempt to maintain an impaired call in a number of ways. For example, a change of service providers may be made. An example of a situation where this may help maintain a failing call may be seen in the illustration of FIG. 1C. In FIG. 1C, the mobile handsets 180, 185, 190 are shown at the border or outside of the main coverage areas 111, 121, 131, 141 (i.e., fringe areas or areas where RF coverage is marginal) available from the base stations 110, 120, 130, 140 connected to MSC 150 of the first wireless service provider. In a representative embodiment of the present invention, a change of service providers from the first service provider with the base stations 110, 120, 130, 140, to the second service provider with base station 160 having larger coverage area 161, may permit the wireless connection with the mobile handsets 180, 185, 190 to be maintained. A representative embodiment of the present invention may maintain the call by performing a change of air interface technologies. For example, if the call was originally established using a IS-95/IS-2000 or similar CDMA service provider, an attempt may be made to maintain the connection by switching to, for example, the base stations of an IS-136 TDMA, an analog, or a GSM service provider. A representative embodiment of the present invention may also use the flexible nature of multi-mode or software-defined radios at base stations such as, for example, the base stations 110, 120, 130, 140, 160 of FIG. 1C, or within mobile handsets such as, for example, the mobile handsets 175, 180, 185, 190 of FIG. 1C to determine the availability of alternate wireless communication networks, or to reconfigure the infrastructure to provide air interface support in an attempt to supplant the existing, impaired wireless connection.

A representative embodiment of the present invention may also attempt to maintain an impaired wireless call by extending the period of time after which the call is considered to be lost. Timers used by the mobile handset or the base stations may be extended depending upon, for example, the enablement of the call recovery capability, the geographic location of the mobile handset, call loss history information for the coverage area that is maintained by either the mobile handset or the wireless communication network, or other factors.

A representative embodiment of the present invention may record and preserve comprehensive call-related information, to allow the re-establishment of call connections in a wide variety of call scenarios. This call-related information may include, for example, the information identifying the actual communication network and network endpoint of each leg of a call, the Internet protocol (IP) addresses of called and/or calling parties, the time of the loss of the call, the geographic location of the affected mobile handset at the time of the call loss, the air interface technology in use, the capabilities of the mobile handset, the identity and capabilities of alternate wireless communication networks in the area where the wireless call was lost, and the speed and direction of the mobile handset, and similar parameters. The availability of such information permits a representative embodiment of the present invention to more effectively re-establish the lost call connection.

In a representative embodiment of the present invention, the determination of whether a call recovery is possible may depend upon a number of factors including, for example, the length of time since the original call was lost, the air interface capabilities of the mobile handset, the number of times the call has previously been re-established, the preferred air interface technology of the wireless subscriber, and other factors. One or more of the factors that determine whether a call recovery should be attempted may be user definable, and the set of factors used to determine whether a call recovery is attempted may depend upon the air interface technology used for the lost call.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for operating a wireless mobile device that automatically re-establishes a telephone call after unintended disconnection, the system comprising:
    at least one processor operable to wirelessly receive, via a communication network, a first telephone call having associated information identifying a calling party;
    said at least one processor operable to determine whether the calling party or the wireless mobile device is to establish a second telephone call between the calling party and the wireless mobile device upon failure of the first telephone call;
    said at least one processor operable to store the information identifying the calling party of the first telephone call;
    said at least one processor operable to detect a failure of the first telephone call;
    said at least one processor operable to determine whether call re-establishment should be attempted, based upon one or more pre-determined factors; and
    said at least one processor operable to automatically establish the second telephone call from the wireless mobile device to the calling party of the first telephone call using the stored information, if it is determined that the wireless mobile device is to establish the second telephone call upon failure of the first telephone call,
    wherein determining whether the calling party is to establish a second telephone call between the calling party and the wireless mobile device upon failure of the first telephone call comprises:
    ascertaining whether the calling party is capable of automatically establishing the second telephone call upon failure of the first telephone call; and
    negotiating to determine whether the wireless mobile device or the calling party is to establish the second telephone call, if the calling party is capable of automatically establishing the second telephone call upon failure of the first telephone call.

2. The system of claim 1, wherein the wireless communication network comprises a cellular communication network.

3. The system of claim 1, wherein the detecting uses at least one characteristic of a wireless communication link.

4. The system of claim 3, wherein the at least one characteristic comprises a signal strength.

5. The system of claim 3, wherein the at least one characteristic comprises an error rate.

6. The system of claim 3, wherein the at least one characteristic comprises a signal-to-noise ratio (SNR).

7. The system of claim 3, wherein the at least one characteristic comprises an Eb/No measurement.

8. The system of claim 1, wherein said at least one processor is operable to wait a predetermined amount of time.

9. The system of claim 1, wherein the establishing comprises:
    determining whether at least one characteristic of a wireless communication link meets a predetermined condition;
    initiating the second telephone call, if the predetermined condition is met; and
    refraining from initiating the second telephone call, if the predetermined condition is not met.

10. The system of claim 9, wherein the at least one characteristic comprises a signal strength.

11. The system of claim 9, wherein the at least one characteristic comprises an error rate.

12. The system of claim 9, wherein the at least one characteristic comprises a signal-to-noise ratio.

13. The system of claim 9, wherein the at least one characteristic comprises an Eb/No measurement.

14. The system of claim 1, wherein the stored information comprises a dialable telephone number.

15. The system of claim 1, wherein the stored information comprises a directory number (DN).

16. The system of claim 1, wherein the stored information comprises a temporary location directory number (TLDN).

17. The system of claim 1, wherein the stored information comprises a mobile identification number (MIN).

18. The system of claim 1, wherein the stored information comprises an international mobile station identifier (IMSI).

19. The system of claim 1, wherein the stored information comprises a temporary mobile station identifier (TMSI).

20. The system of claim 1, wherein the stored information comprises an electronic serial number (ESN).

21. The system of claim 1, wherein said at least one processor is operable to notify a user that a telephone call is about to be re-established.

22. The system of claim 21, wherein the notifying comprises an audible alert.

23. The system of claim 21, wherein the notifying comprises a vibratory alert.

24. The system of claim 21, wherein the notifying comprises a visual alert.

25. A system of operating a wireless mobile device that automatically re-establishes a telephone call after unintended disconnection, the system comprising:
    at least one processor operable to wirelessly originate, via a communication network, a first telephone call having associated information identifying a called party;
    said at least one processor operable to determine whether the called party or the wireless mobile device is to establish a second telephone call between the called party and the wireless mobile device upon failure of the first telephone call;
    said at least one processor operable to store the information identifying the called party of the first telephone call;
    said at least one processor operable to detect a failure of the first telephone call;
    said at least one processor operable to determine whether call re-establishment should be attempted, based upon one or more pre-determined factors; and
    said at least one processor operable to automatically establish the second telephone call from the wireless mobile device to the called party of the first telephone call using the stored information, if it is determined that the wireless mobile device is to establish the second telephone call upon failure of the first telephone call,
    wherein determining whether the called party is to establish a second telephone call between the called party and the wireless mobile device upon failure of the first telephone call comprises:
    ascertaining whether the called party is capable of automatically establishing the second telephone call upon failure of the first telephone call; and negotiating to determine whether the wireless mobile device or the called party is to establish the second telephone call, if the calling party is capable of automatically establishing the second telephone call upon failure of the first telephone call.

26. The system of claim 25, wherein the wireless communication network comprises a cellular communication network.

27. The system of claim 25, wherein the detecting uses at least one characteristic of a wireless communication link.

28. The system of claim 27, wherein the at least one characteristic comprises a signal strength.

29. The system of claim 27, wherein the at least one characteristic comprises an error rate.

30. The system of claim 27, wherein the at least one characteristic comprises a signal-to-noise ratio.

31. The system of claim 27, wherein the at least one characteristic comprises an Eb/No measurement.

32. The system of claim 25, wherein said at least one processor is operable to wait a predetermined amount of time.

33. The system of claim 25, wherein the establishing comprises:
 determining whether at least one characteristic of a wireless communication link meets a predetermined condition;
 initiating the second telephone call, if the predetermined condition is met; and
 refraining from initiating the second telephone call, if the predetermined condition is not met.

34. The system of claim 33, wherein the at least one characteristic comprises a signal strength.

35. The system of claim 33, wherein the at least one characteristic comprises an error rate.

36. The system of claim 33, wherein the at least one characteristic comprises a signal-to-noise ratio.

37. The system of claim 33, wherein the at least one characteristic comprises an Eb/No measurement.

38. The system of claim 25, wherein the stored information comprises a dialable telephone number.

39. The system of claim 25, wherein the stored information comprises a directory number (DN).

40. The system of claim 25, wherein the stored information comprises a temporary location directory number (TLDN).

41. The system of claim 25, wherein the stored information comprises a mobile identification number (MIN).

42. The system of claim 25, wherein the stored information comprises an international mobile station identifier (IMSI).

43. The system of claim 25, wherein the stored information comprises a temporary mobile station identifier (TMSI).

44. The system of claim 25, wherein the stored information comprises an electronic serial number (ESN).

45. The system of claim 25, wherein said at least one processor is operable to notify a user that a telephone call is about to be re-established.

46. The system of claim 45, wherein the notifying comprises an audible alert.

47. The system of claim 45, wherein the notifying comprises a vibratory alert.

48. The system of claim 45, wherein the notifying comprises a visual alert.

49. A system of automatically re-establishing a telephone call after unintended disconnection, the system comprising:
 at least one processor operable to establish a first telephone call between a first party having associated information identifying the first party and a second party having associated information identifying the second party, one or both of the first party and/or the second party communicating wirelessly via a communication network;
 said at least one processor operable to store the information identifying the first party and the second party;
 said at least one processor operable to detect a failure of the first telephone call;
 said at least one processor operable to ascertain whether one or both of the first party and/or the second party have requested that a second telephone call be established between the first party and the second party by the communication network in the event of the failure of the first telephone call;
 said at least one processor operable to determine whether call re-establishment should be attempted, based upon one or more pre-determined factors; and
 said at least one processor operable to automatically establish the second telephone call between the first party and the second party, using the stored information, if it is determined that one or both of the first party and/or the second party have requested that a lost call be automatically re-established,
 wherein ascertaining whether one or both of the first party and/or the second party have requested that a second telephone call be established between the first party and the second party by the communication network in the event of the failure of the first telephone call comprises examining a subscriber database to determine whether one or both of the first party and the second party have requested that a lost call be automatically re-established.

50. The system of claim 49, wherein the wireless communication network comprises a cellular communication network.

51. The system of claim 49, wherein the detecting uses at least one characteristic of a wireless communication link.

52. The system of claim 51, wherein the at least one characteristic comprises a signal strength.

53. The system of claim 51, wherein the at least one characteristic comprises an error rate.

54. The system of claim 51, wherein the at least one characteristic comprises a signal-to-noise ratio.

55. The system of claim 51, wherein the at least one characteristic comprises an Eb/No measurement.

56. The system of claim 49, wherein said at least one processor is operable to wait a predetermined amount of time.

57. The system of claim 49, wherein the establishing comprises:
 determining whether at least one characteristic of a wireless communication link meets a predetermined condition;
 initiating the second telephone call, if the predetermined condition is met; and
 refraining from initiating the second telephone call, if the predetermined condition is not met.

58. The system of claim 57, wherein the at least one characteristic comprises a signal strength.

59. The system of claim 57, wherein the at least one characteristic comprises an error rate.

60. The system of claim 57, wherein the at least one characteristic comprises a signal-to-noise ratio.

61. The system of claim 57, wherein the at least one characteristic comprises an Eb/No measurement.

62. The system of claim 49, wherein the stored information comprises a dialable telephone number.

63. The system of claim 49, wherein the stored information comprises a directory number (DN).

64. The system of claim 49, wherein the stored information comprises a temporary location directory number (TLDN).

65. The system of claim 49, wherein the stored information comprises a mobile identification number (MIN).

66. The system of claim 49, wherein the stored information comprises an international mobile station identifier (IMSI).

67. The system of claim 49, wherein the stored information comprises a temporary mobile station identifier (TMSI).

68. The system of claim 49, wherein the stored information comprises an electronic serial number (ESN).

69. The system of claim 49, wherein said at least one processor is operable to notify a user that a telephone call is about to be re-established.

70. The system of claim 69, wherein the notifying comprises an audible alert.

71. The system of claim 69, wherein the notifying comprises a vibratory alert.

72. The system of claim 69, wherein the notifying comprises a visual alert.

73. The system of claim 1, wherein the one or more predetermined factors are user-definable.

74. The system of claim 73, wherein the one or more predetermined factors comprise information identifying a designated calling party.

75. The system of claim 73, wherein the one or more predetermined factors comprise a cost of use of a communication network.

76. The system of claim 1, wherein the one or more predetermined factors employed in the determining are selected based upon an air interface technology of a wireless communication network.

77. The system of claim 25, wherein the one or more predetermined factors are user-definable.

78. The system of claim 77, wherein the one or more predetermined factors comprise information identifying a designated called party.

79. The system of claim 77, wherein the one or more predetermined factors comprise a cost of use of an available communication network.

80. The system of claim 25, wherein the one or more predetermined factors employed in the determining are selected based upon an air interface technology of a wireless communication network.

81. The system of claim 49, wherein the one or more predetermined factors are user-definable.

82. The system of claim 81, wherein the one or more predetermined factors comprise information identifying a designated called or calling party.

83. The system of claim 81, wherein the one or more predetermined factors comprise a cost of use of an available communication network.

84. The system of claim 49, wherein the one or more predetermined factors employed in the determining are selected based upon an air interface technology of a wireless communication network.

85. The system of claim 1, wherein said ascertaining of whether the calling party is capable of automatically establishing the second telephone call upon failure of the first telephone call comprises exchanging information using short message service (SMS) messaging.

86. The system of claim 25, wherein said ascertaining of whether the called party is capable of automatically establishing the second telephone call upon failure of the first telephone call comprises exchanging information using short message service (SMS) messaging.

87. The system of claim 49, wherein the subscriber database comprises one of a home location register (HLR) and a database at a mobile switching center (MSC).

88. A system for operating a wireless mobile device that automatically re-establishes a telephone call after unintended disconnection, the system comprising:
one or more circuits operable to wirelessly receive, via a communication network, a first telephone call having associated information identifying a calling party;
said one or more circuits operable to determine whether the calling party or the wireless mobile device is to establish a second telephone call between the calling party and the wireless mobile device upon failure of the first telephone call;
said one or more circuits operable to store the information identifying the calling party of the first telephone call;
said one or more circuits operable to detect a failure of the first telephone call;
said one or more circuits operable to determine whether call re-establishment should be attempted, based upon one or more pre-determined factors; and
said one or more circuits operable to automatically establish the second telephone call from the wireless mobile device to the calling party of the first telephone call using the stored information, if it is determined that the wireless mobile device is to establish the second telephone call upon failure of the first telephone call,
wherein determining whether the calling party is to establish a second telephone call between the calling party and the wireless mobile device upon failure of the first telephone call comprises:
ascertaining whether the calling party is capable of automatically establishing the second telephone call upon failure of the first telephone call; and
negotiating to determine whether the wireless mobile device or the calling party is to establish the second telephone call, if the calling party is capable of automatically establishing the second telephone call upon failure of the first telephone call.

89. The system of claim 88, wherein the wireless communication network comprises a cellular communication network.

90. The system of claim 88, wherein the detecting uses at least one characteristic of a wireless communication link.

91. The system of claim 90, wherein the at least one characteristic comprises a signal strength.

92. The system of claim 90, wherein the at least one characteristic comprises an error rate.

93. The system of claim 90, wherein the at least one characteristic comprises a signal-to-noise ratio.

94. The system of claim 90, wherein the at least one characteristic comprises an Eb/No measurement.

95. The system of claim 88, wherein said at least one processor is operable to wait a predetermined amount of time.

96. The system of claim 88, wherein the establishing comprises:
determining whether at least one characteristic of a wireless communication link meets a predetermined condition;
initiating the second telephone call, if the predetermined condition is met; and
refraining from initiating the second telephone call, if the predetermined condition is not met.

97. The system of claim 96, wherein the at least one characteristic comprises a signal strength.

98. The system of claim 96, wherein the at least one characteristic comprises an error rate.

99. The system of claim 96, wherein the at least one characteristic comprises a signal-to-noise ratio.

100. The system of claim 96, wherein the at least one characteristic comprises an Eb/No measurement.

101. The system of claim 88, wherein the stored information comprises a dialable telephone number.

102. The system of claim 88, wherein the stored information comprises a directory number (DN).

103. The system of claim 88, wherein the stored information comprises a temporary location directory number (TLDN).

104. The system of claim 88, wherein the stored information comprises a mobile identification number (MIN).

105. The system of claim 88, wherein the stored information comprises an international mobile station identifier (IMSI).

106. The system of claim 88, wherein the stored information comprises a temporary mobile station identifier (TMSI).

107. The system of claim 88, wherein the stored information comprises an electronic serial number (ESN).

108. The system of claim 88, wherein said one or more circuits is operable to notify a user that a telephone call is about to be re-established.

109. The system of claim 108, wherein the notifying comprises an audible alert.

110. The system of claim 108, wherein the notifying comprises a vibratory alert.

111. The system of claim 108, wherein the notifying comprises a visual alert.

112. A system of operating a wireless mobile device that automatically re-establishes a telephone call after unintended disconnection, the system comprising:
one or more circuits operable to wirelessly originate, via a communication network, a first telephone call having associated information identifying a called party;
said one or more circuits operable to determine whether the called party or the wireless mobile device is to establish a second telephone call between the called party and the wireless mobile device upon failure of the first telephone call;
said one or more circuits operable to store the information identifying the called party of the first telephone call;
said one or more circuits operable to detect a failure of the first telephone call;
said one or more circuits operable to determine whether call re-establishment should be attempted, based upon one or more pre-determined factors; and
said one or more circuits operable to automatically establish the second telephone call from the wireless mobile device to the called party of the first telephone call using the stored information, if it is determined that the wireless mobile device is to establish the second telephone call upon failure of the first telephone call,
wherein determining whether the called party is to establish a second telephone call between the called party and the wireless mobile device upon failure of the first telephone call comprises:
ascertaining whether the called party is capable of automatically establishing the second telephone call upon failure of the first telephone call; and
negotiating to determine whether the wireless mobile device or the called party is to establish the second telephone call, if the calling party is capable of automatically establishing the second telephone call upon failure of the first telephone call.

113. The system of claim 112, wherein the wireless communication network comprises a cellular communication network.

114. The system of claim 112, wherein the detecting uses at least one characteristic of a wireless communication link.

115. The system of claim 114, wherein the at least one characteristic comprises a signal strength.

116. The system of claim 114, wherein the at least one characteristic comprises an error rate.

117. The system of claim 114, wherein the at least one characteristic comprises a signal-to-noise ratio.

118. The system of claim 114, wherein the at least one characteristic comprises an Eb/No measurement.

119. The system of claim 112, wherein said at least one processor is operable to wait a predetermined amount of time.

120. The system of claim 112, wherein the establishing comprises:
determining whether at least one characteristic of a wireless communication link meets a predetermined condition;
initiating the second telephone call, if the predetermined condition is met; and
refraining from initiating the second telephone call, if the predetermined condition is not met.

121. The system of claim 120, wherein the at least one characteristic comprises a signal strength.

122. The system of claim 120, wherein the at least one characteristic comprises an error rate.

123. The system of claim 120, wherein the at least one characteristic comprises a signal-to-noise ratio.

124. The system of claim 120, wherein the at least one characteristic comprises an Eb/No measurement.

125. The system of claim 112, wherein the stored information comprises a dialable telephone number.

126. The system of claim 112, wherein the stored information comprises a directory number (DN).

127. The system of claim 112, wherein the stored information comprises a temporary location directory number (TLDN).

128. The system of claim 112, wherein the stored information comprises a mobile identification number (MIN).

129. The system of claim 112, wherein the stored information comprises an international mobile station identifier (IMSI).

130. The system of claim 112, wherein the stored information comprises a temporary mobile station identifier (TMSI).

131. The system of claim 112, wherein the stored information comprises an electronic serial number (ESN).

132. The system of claim 112, wherein said one or more circuits is operable to notify a user that a telephone call is about to be re-established.

133. The system of claim 132, wherein the notifying comprises an audible alert.

134. The system of claim 132, wherein the notifying comprises a vibratory alert.

135. The system of claim 132, wherein the notifying comprises a visual alert.

136. A system of automatically re-establishing a telephone call after unintended disconnection, the system comprising:
one or more circuits operable to establish a first telephone call between a first party having associated information identifying the first party and a second party having associated information identifying the second party, one or both of the first party and/or the second party communicating wirelessly via a communication network;
said one or more circuits operable to store the information identifying the first party and the second party;
said one or more circuits operable to detect a failure of the first telephone call;

said one or more circuits operable to ascertain whether one or both of the first party and/or the second party have requested that a second telephone call be established between the first party and the second party by the communication network in the event of the failure of the first telephone call;

said one or more circuits operable to determine whether call re-establishment should be attempted, based upon one or more pre-determined factors; and said one or more circuits operable to automatically establish the second telephone call between the first party and the second party, using the stored information, if it is determined that one or both of the first party and/or the second party have requested that a lost call be automatically re-established, wherein ascertaining whether one or both of the first party and/or the second party have requested that a second telephone call be established between the first party and the second party by the communication network in the event of the failure of the first telephone call comprises examining a subscriber database to determine whether one or both of the first party and the second party have requested that a lost call be automatically re-established.

137. The system of claim 136, wherein the wireless communication network comprises a cellular communication network.

138. The system of claim 136, wherein the detecting uses at least one characteristic of a wireless communication link.

139. The system of claim 138, wherein the at least one characteristic comprises a signal strength.

140. The system of claim 138, wherein the at least one characteristic comprises an error rate.

141. The system of claim 138, wherein the at least one characteristic comprises a signal-to-noise ratio.

142. The system of claim 138, wherein the at least one characteristic comprises an Eb/No measurement.

143. The system of claim 136, wherein said at least one processor is operable to wait a predetermined amount of time.

144. The system of claim 136, wherein the establishing comprises:
   determining whether at least one characteristic of a wireless communication link meets a predetermined condition;
   initiating the second telephone call, if the predetermined condition is met; and
   refraining from initiating the second telephone call, if the predetermined condition is not met.

145. The system of claim 144, wherein the at least one characteristic comprises a signal strength.

146. The system of claim 144, wherein the at least one characteristic comprises an error rate.

147. The system of claim 144, wherein the at least one characteristic comprises a signal-to-noise ratio.

148. The system of claim 144, wherein the at least one characteristic comprises an Eb/No measurement.

149. The system of claim 136, wherein the stored information comprises a dialable telephone number.

150. The system of claim 136, wherein the stored information comprises a directory number (DN).

151. The system of claim 136, wherein the stored information comprises a temporary location directory number (TLDN).

152. The system of claim 136, wherein the stored information comprises a mobile identification number (MIN).

153. The system of claim 136, wherein the stored information comprises an international mobile station identifier (IMSI).

154. The system of claim 136, wherein the stored information comprises a temporary mobile station identifier (TMSI).

155. The system of claim 136, wherein the stored information comprises an electronic serial number (ESN).

156. The system of claim 136, wherein said one or more circuits is operable to notify a user that a telephone call is about to be re-established.

157. The system of claim 156, wherein the notifying comprises an audible alert.

158. The system of claim 156, wherein the notifying comprises a vibratory alert.

159. The system of claim 156, wherein the notifying comprises a visual alert.

160. The system of claim 88, wherein the one or more predetermined factors are user-definable.

161. The system of claim 160, wherein the one or more predetermined factors comprise information identifying a designated calling party.

162. The system of claim 160, wherein the one or more predetermined factors comprise a cost of use of a communication network.

163. The system of claim 88, wherein the one or more predetermined factors employed in the determining are selected based upon an air interface technology of a wireless communication network.

164. The system of claim 112, wherein the one or more predetermined factors are user-definable.

165. The system of claim 164, wherein the one or more predetermined factors comprise information identifying a designated called party.

166. The system of claim 164, wherein the one or more predetermined factors comprise a cost of use of an available communication network.

167. The system of claim 112, wherein the one or more predetermined factors employed in the determining are selected based upon an air interface technology of a wireless communication network.

168. The system of claim 136, wherein the one or more predetermined factors are user-definable.

169. The system of claim 168, wherein the one or more predetermined factors comprise information identifying a designated called or calling party.

170. The system of claim 168, wherein the one or more predetermined factors comprise a cost of use of an available communication network.

171. The system of claim 136, wherein the one or more predetermined factors employed in the determining are selected based upon an air interface technology of a wireless communication network.

172. The system of claim 88, wherein ascertaining whether the calling party is capable of automatically establishing the second telephone call upon failure of the first telephone call comprises exchanging information using short message service (SMS) messaging.

173. The system of claim 112, wherein ascertaining whether the called party is capable of automatically establishing the second telephone call upon failure of the first telephone call comprises exchanging information using short message service (SMS) messaging.

174. The system of claim 136, wherein the subscriber database comprises one of a home location register (HLR) and a database at a mobile switching center (MSC).

* * * * *